(12) United States Patent
Hara

(10) Patent No.: US 7,184,171 B2
(45) Date of Patent: Feb. 27, 2007

(54) IMAGE PROCESSING METHOD AND APPARATUS AND IMAGE PROCESSING SYSTEM

(75) Inventor: Kenji Hara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1058 days.

(21) Appl. No.: 10/160,170

(22) Filed: Jun. 4, 2002

(65) Prior Publication Data

US 2002/0186390 A1 Dec. 12, 2002

(30) Foreign Application Priority Data

Jun. 7, 2001 (JP) ............... 2001-172736

(51) Int. Cl.
*G06F 15/00* (2006.01)
*B41B 1/00* (2006.01)

(52) U.S. Cl. ............ 358/1.9; 358/1.13; 358/505

(58) Field of Classification Search ........... 358/1.1, 358/1.9, 2.1, 1.13, 501, 505
See application file for complete search history.

(56) References Cited

U.S. PATENT DOCUMENTS 5,721,620 A * 2/1998 Arai et al. ............ 358/296
5,884,120 A * 3/1999 Ito et al. ............ 399/54
6,621,944 B1 * 9/2003 Takahagi et al. ............ 382/319

FOREIGN PATENT DOCUMENTS

| EP | 0854632 | 7/1998 |
| EP | 1094661 | 4/2001 |
| JP | 07013399 A * | 1/1995 |

OTHER PUBLICATIONS

U.S. Appl. No. 09/688,224, filed Oct. 16, 2000.

* cited by examiner

*Primary Examiner*—Thomas D. Lee
(74) *Attorney, Agent, or Firm*—Fitzpatrick, Cella, Harper & Scinto

(57) ABSTRACT

A scanner interface (383) inputs the image data obtained by one optical scan on an original. An HDD controller (2001) performs ACS determination to determine on the basis of the image data whether the original is a color original, and holds the image data and determination result as a pair in the HDD (2002) serving as an image server. Optimal image formation using the held image data is performed by setting optimal parameters in an edge emphasizing unit (214), output gamma conversion unit (215), and the like on the basis of the determination result.

15 Claims, 19 Drawing Sheets

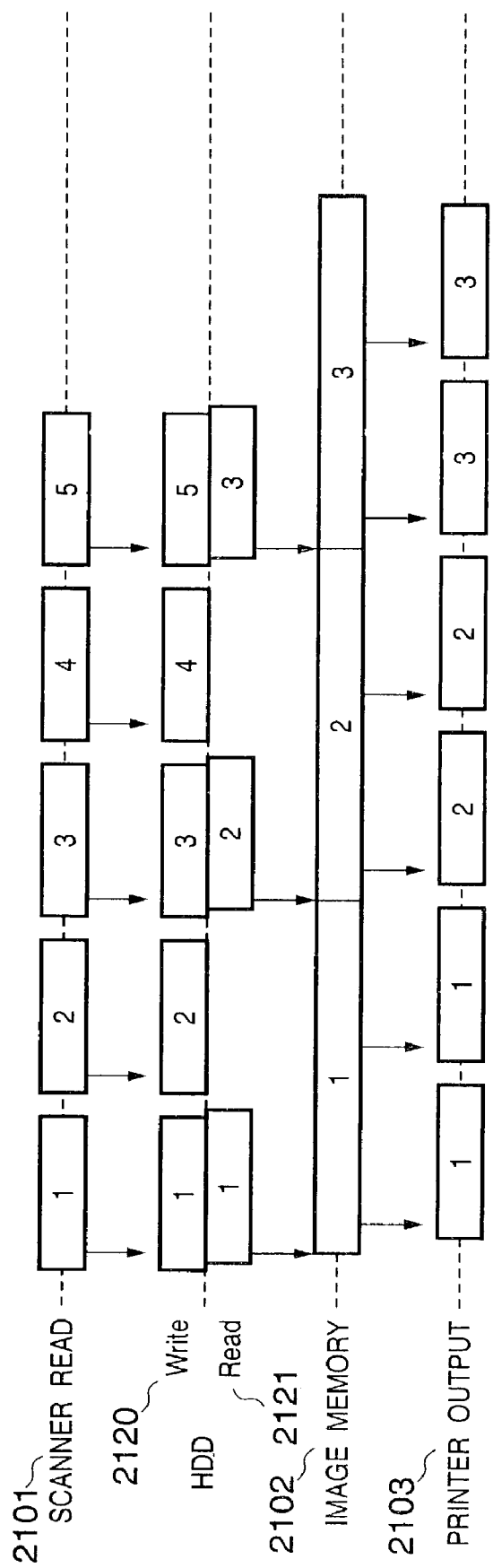

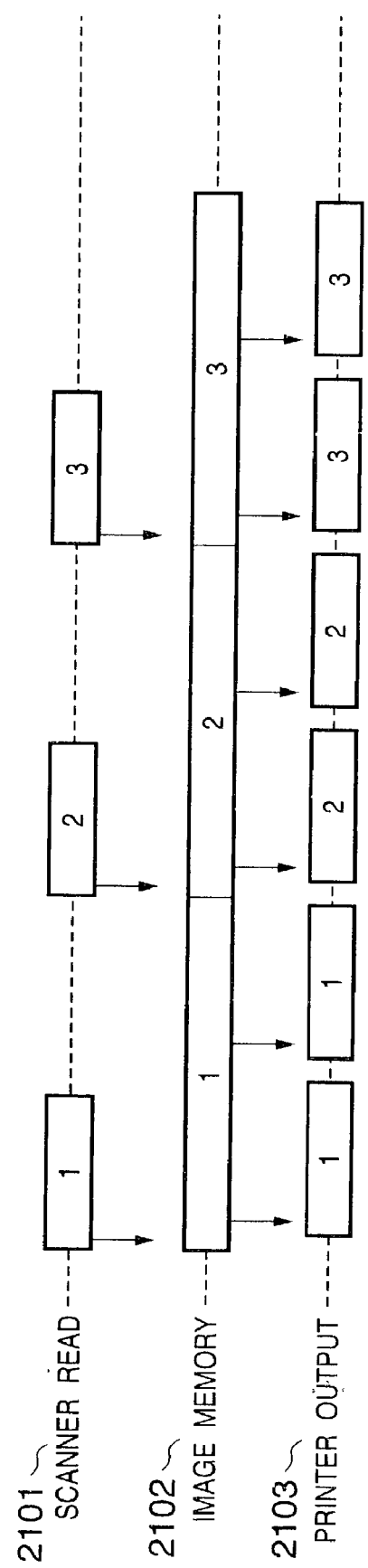

FIG. 11

| Image ID | | ~ 2201 |
|---|---|---|
| Color | | ~ 2202 |
| Resolution | | ~ 2203 |
| Image Size | | ~ 2204 |
| Date | | ~ 2205 |

FIG. 12B
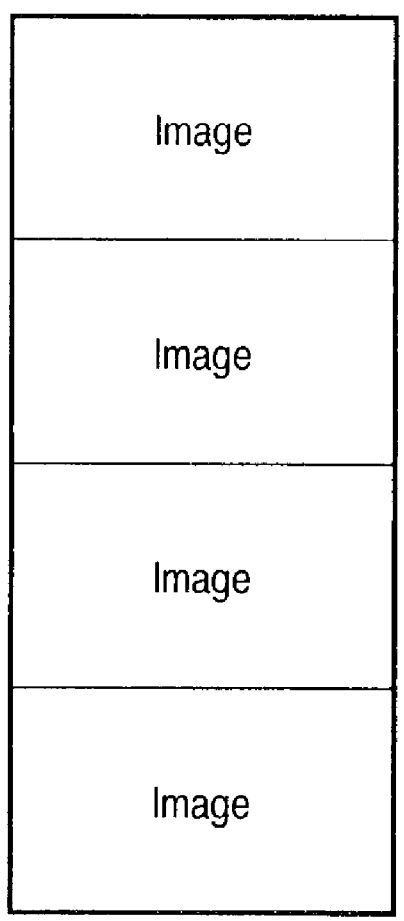
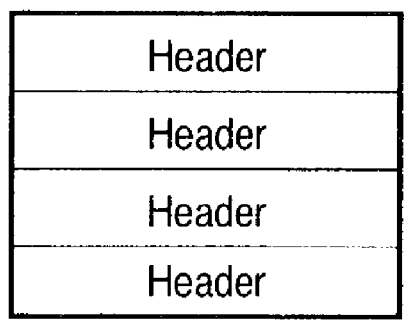

FIG. 15

| Image ID | | ~2201 |
|---|---|---|
| Color | | ~2202 |
| Resolution | | ~2203 |
| Image Size | | ~2204 |
| Box ID | | (2206) |
| Date | | ~2205 |

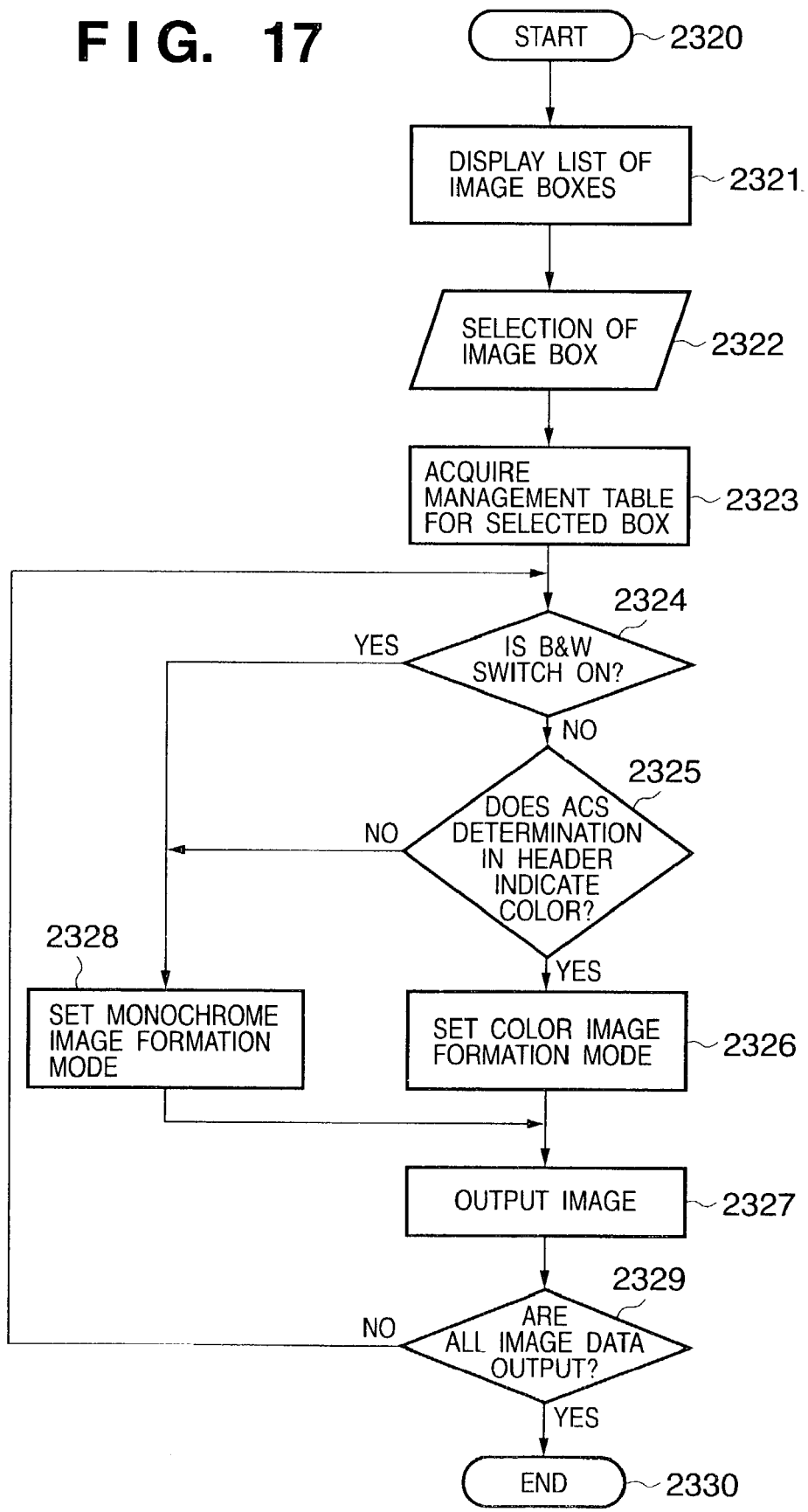

IMAGE PROCESSING METHOD AND APPARATUS AND IMAGE PROCESSING SYSTEM

FIELD OF THE INVENTION

The present invention relates to an image processing method and apparatus and image processing system and, more particularly, to an image processing method and apparatus and image processing system which perform color determination on input image data.

BACKGROUND OF THE INVENTION

Among image processing apparatuses designed to input image data by scanning and reading original images, an apparatus having the ACS (Auto Color Select) function of automatically determining whether a read original image is a monochrome or color image is known.

In the above conventional image processing apparatus, however, in executing ACS operation, a prescan for ACS operation must be performed before the execution of a real scan to read the image data. The processing time in this case is longer than that in the case where only a real scan is performed without ACS operation, resulting in a decrease in productivity of the apparatus as a whole.

SUMMARY OF THE INVENTION

The present invention has been proposed to solve these conventional problems, and has as its object to provide an image processing method, apparatus and image processing system which improve the overall productivity of the apparatus by executing ACS operation for an original image at high speed, and performing proper image formation by holding the ACS determination result together with the image data.

As a means for achieve the above object, an image processing apparatus according to the present invention has the following arrangement.

This arrangement is comprising input means for inputting image data of an original by one optical scan, determination means for determining on the basis of the image data whether the original is a color original, nonvolatile holding means which can hold a plurality of pairs of the image data and the determination results obtained by the determination means, and output means for outputting image data held in the holding means on the basis of the corresponding determination result.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10A is an image data transition chart when two copies are output in this embodiment;

FIG. 10B is an image data transition chart in the absence of an HDD;

FIG. 11 is a view showing the header format of image data in this embodiment;

FIG. 12B is a view showing another example of how headers for a plurality of image data are stored;

FIG. 15 is a view showing the header format of image data in the second embodiment;

FIG. 17 is a flow chart showing print processing using an image box function in the second embodiment.

DETAILED DESCRIPTION OF THE PREFERRED EMBODIMENTS

The preferred embodiments of the present invention will now be described in detail in accordance with the accompanying drawings.

<First Embodiment>

The basic arrangement of an image forming apparatus according to the first embodiment will be described first with reference to FIGS. 1 to 4.

Figure 1:
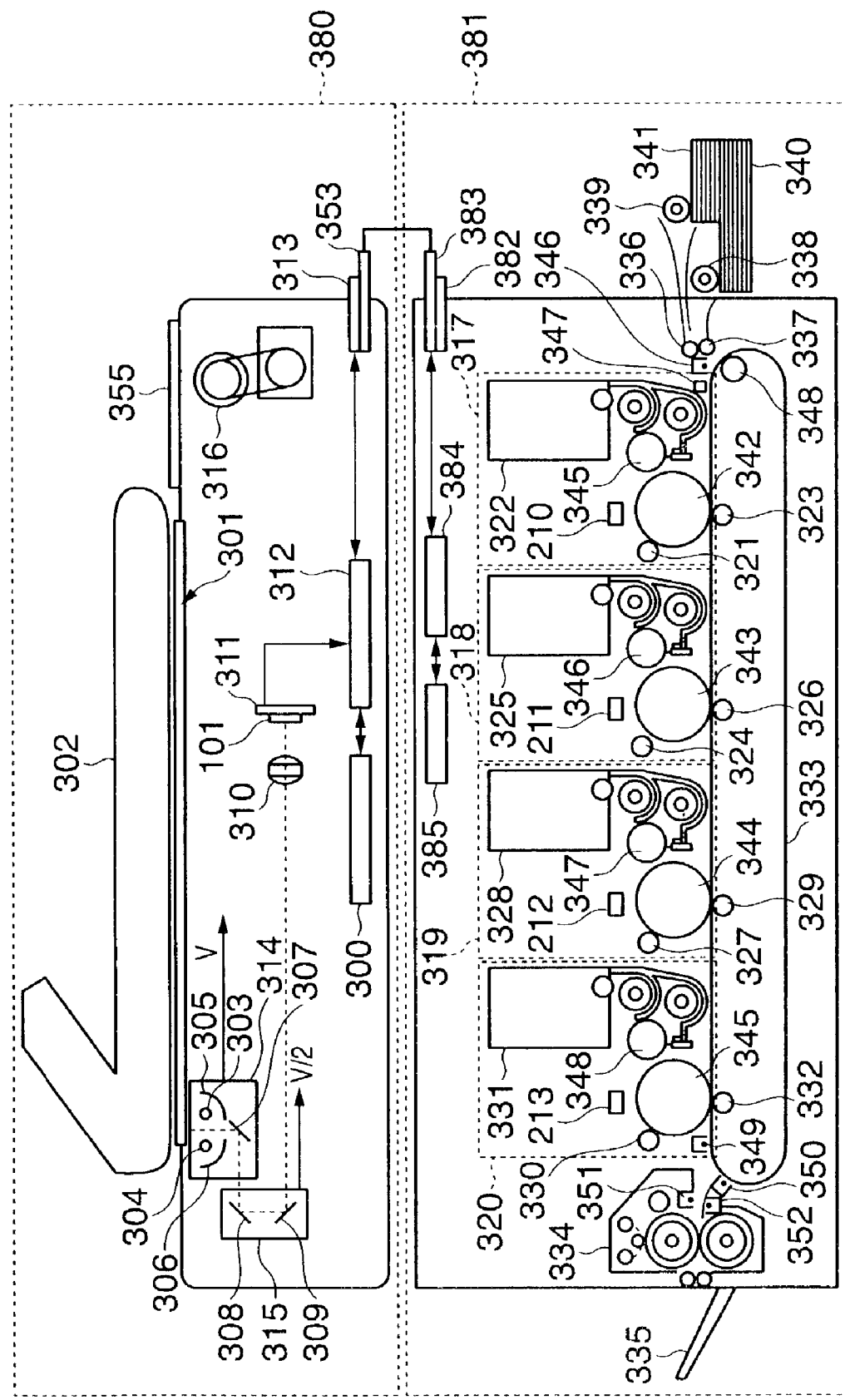
FIG. 1 is a view showing the overall arrangement of an image forming apparatus according to one embodiment of the present invention.

FIG. 1 is a block diagram showing the overall arrangement of the image forming apparatus according to this embodiment. Referring to FIG. 1, the image forming apparatus of the embodiment is roughly constituted by a scanner unit 380 and printer unit 381. The arrangement of each unit will be described in detail below.

<Arrangement of Scanner Unit>

The arrangement of the scanner unit 380 will be described in detail first with reference to FIG. 1.

[Outline of Apparatus Configuration]

The scanner unit 380 includes a CCD 101 for detecting a color image signal. This CCD may be designed such that R, G, and B color filters are formed in line on a one-line CCD in the order of R, G, and B or R, G, and B filters may be arranged for a three-line CCD. Each filter may be an on-chip filter or designed separately from a CCD. Reference numeral 311 denotes a substrate on which the CCD 101 is mounted.

Reference numeral 300 denotes a scanner CPU for controlling the overall scanner unit 380 by using a RAM (not shown) as a work area on the basis of the control programs stored in a ROM (not shown); and 312, a digital image processing unit for digitizing an analog image signal sent from the CCD board 311 and performing digital image processing. This unit is formed on an image processing substrate.

Reference numeral 301 denotes a document glass; and 302, a document feeder. Note that a platen (not shown) may be mounted in place of the document feeder 302.

Reference numerals 303 and 304 denote light sources (e.g., halogen lamps or fluorescent lamps) for illuminating a document; 305 and 306, reflectors for focusing light from the light sources 303 and 304 onto a document; 307 to 309, mirrors for optically guiding the document set on the platen onto the CCD 101; 310, a lens for focusing projection light from the mirrors onto the CCD 101; 314, a first mirror base (to be referred to as the first carriage hereinafter) accommodating the halogen lamps 303 and 304, reflectors 305 and 306, and mirror 307; 315, a second mirror base (to be referred to as the second carriage hereinafter) accommodating the mirrors 308 and 309; and a 316, a stepping motor driving unit for driving the first and second carriages 314 and 315 in the sub-scanning direction (the lateral direction in FIG. 1).

Reference numeral 313 denotes an external interface for interfacing with other devices. Although not shown in FIG. 1, in this embodiment, a device that is required to use the images obtained by this scanner, e.g., a LAN interface device for connection to a network, a SCSI interface device for connection to a personal computer or the like, or a FAX device for the operation of a FAX, can be connected to the external interface 313. Image data in a predetermined form can be output from the external interface 313 at a predetermined timing by making the scanner CPU 300 communicate with the CPU of an external device via the external interface 313.

Reference numeral 353 denotes a dedicated interface that is used to exchange image data and various instructions with a printer which takes charge of image output operation when the scanner unit 380 is to be used as part of an image copying apparatus.

Reference numeral 355 denotes an operation unit for displaying the state of the overall image forming apparatus including the scanner unit 380 and printer unit 381 and inputting user instructions. The operation unit 355 has an LCD panel, various operation buttons, and the like.

[Scan Method]

A specific scan method in the scanner unit 380 will be described below.

When a document is placed on the DF 302 or document glass 301 by the user, the scanner CPU 300 gives an instruction to read an image to each unit in accordance with the occurrence of a document read event such as pressing of a copy button. More specifically, the scanner CPU 300 turns on the light sources 303 and 304 and sets the CCD board 311 in the operative state, and sets image processing parameters in the digital image processing unit 312.

When the necessary preparations are made, the stepping motor driving unit 316 is operated to drive the first carriage 314 at a constant speed in the sub-scanning direction (a direction perpendicular to the sensor array direction, or main scanning direction) of the CCD 101, thereby sequentially irradiating the entire surface of the document with light. The second carriage 315 is designed to move at a speed ½ that of the first carriage 314 at this time. This allows the light reflected by the document to be accurately focused on the CCD 101.

The CCD 101 is constituted by light-receiving sensors arrayed in the main scanning direction (the front-to-back direction in FIG. 1). The CCD 101 can sequentially receive analog voltages proportional to light amounts from registers corresponding to the respective light-receiving sensors in a predetermined cycle. The entire document surface can be read as a two-dimensional image by repeating this operation of making the CCD 101 continuously receive voltages in the main scanning direction and moving the first carriage 314 in the sub-scanning direction. Note that the obtained 2-D image data forms a one-dimensional array along the time axis.

The image data read by the CCD 101 is transferred to the digital image processing unit 312 to be subjected to appropriate image processing. The resultant data is output from the scanner unit 380 via the external interface 313 or printer interface 353.

[Details of Scanner Image Processing]

Figure 2:
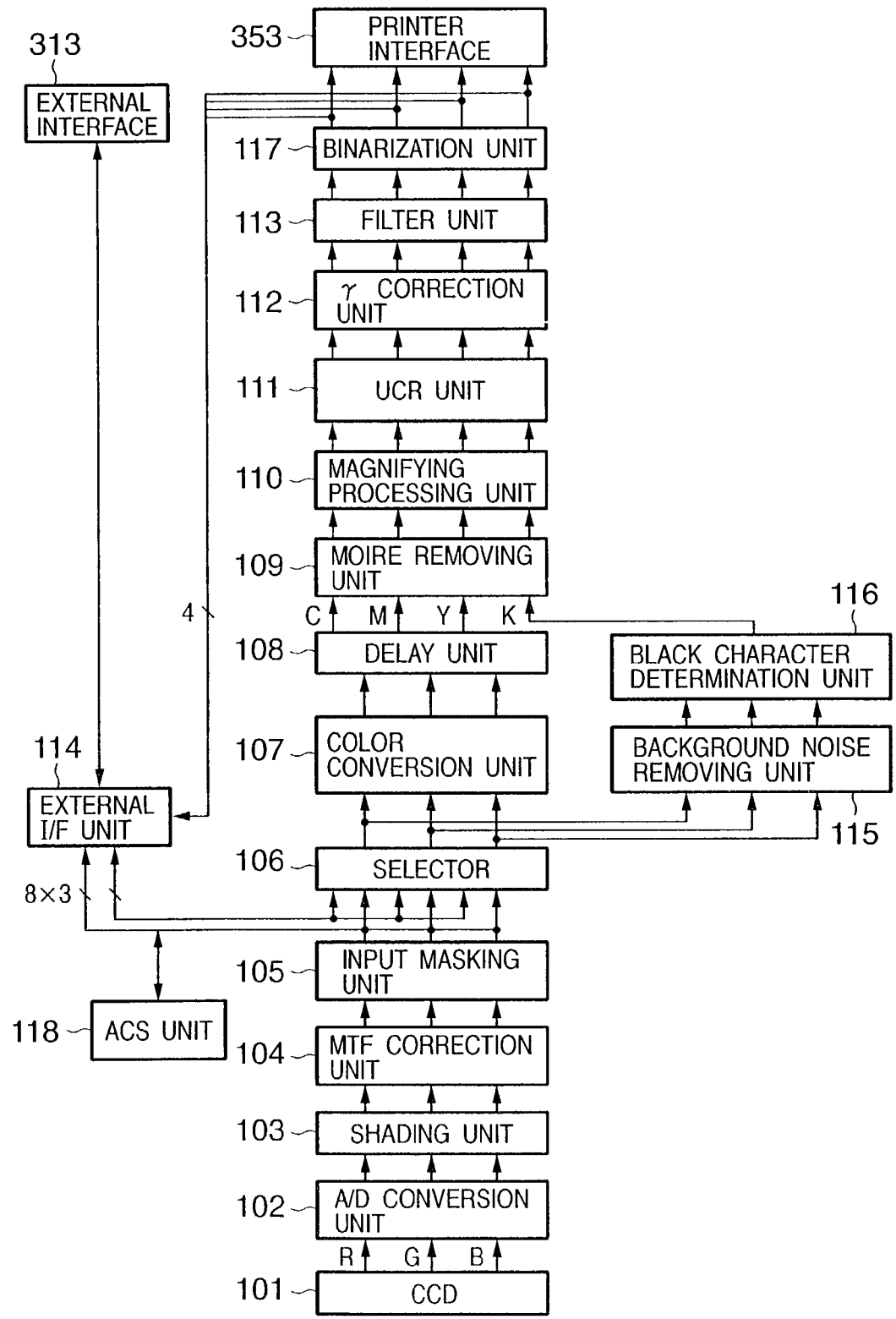
FIG. 2 is a block diagram showing the arrangement of an image processing unit in a scanner unit.

Digital image processing in the digital image processing unit 312 in a case wherein the scanner unit 380 operates as part of the image copying apparatus will be described in detail below. FIG. 2 is a block diagram showing the detailed arrangement of the digital image processing unit 312. Each component is controlled by the scanner CPU 300.

An original image on the document glass 301 is guided to the CCD 101 to be converted into an analog electrical signal in the above manner. This signal is input to the digital image processing unit 312. The analog image signal input to the digital image processing unit 312 is sampled/held (S/H) by an A/D conversion unit 102 and clamped using the dark level of the analog image signal as a reference potential so as to amplify it to a predetermined amount. The resultant signal is then A/D-converted into, for example, a digital signal constituted by 8-bit R, G, and B data. Note that the processing sequence in the above arrangement is not limited to this, and can be changed as needed.

The obtained RGB signal undergoes shading correction and black correction in a shading unit 103. The resultant signal is input to an MTF correction unit 104 to be subject to merging processing, MTF correction processing, and original detection processing. When the CCD 101 is a three-line CCD, different read positions are set for the respective lines. In this case, therefore, "merging processing" is performed to correct signal timings so as to match the read positions for the three lines by adjusting the delay amounts of the respective lines in accordance with a read speed. The MTF for reading changes depending on the read speed or magnification. MTF correction processing is therefore done to correct the change. Original detection processing is done to recognize the size of the original by scanning the original on the document glass 301.

The digital signal having undergone read position timing correction is subjected to spectral characteristic correction in the CCD 101, light sources 303 and 304, and reflectors 305 and 306. The output from the input masking unit 105 is input to a selector 106 which can switch between itself and an external input signal received via an external I/F unit 114. The signal output from the selector 106 is input to a color conversion unit 107 and background noise removing unit 115. The signal input to the background noise removing unit 115 is subjected to background noise removal processing. The resultant signal is input to a black character determination unit 116 for determining whether a given signal represents a black character in an original. The black character determination unit 116 then generates a black character determination signal. The color conversion unit 107, to which another output from the selector 106 is input, determines whether the read image signal falls within the color range in which color reproduction can be done by the printer. If the signal falls within the range, the signal is kept unchanged. If the signal falls outside the range, the color conversion unit 107 performs color space compression processing to make the signal fall within the range. After background noise removal processing, the RGB signal is converted into a CMY signal by LOG conversion.

The timing of the CMY signal output from the color conversion unit 107 is adjusted by a delay unit 108 to correct a timing shift from the timing of the black character determination signal generated by the black character determination unit 116. These two types of signals undergo moiré removal processing in a moiré removing unit 109 and magnifying processing in the main-scanning direction in a magnifying processing unit 110. The resultant signal is input to an UCR unit 111. In the UCR unit 111, a CMYK signal is generated by performing UCR (Under Color Removal) processing for the CMY signal, and the signal is corrected into a signal that matches the output characteristics of the printer by masking processing. In addition, the black character determination signal is fed back to the CMYK signal. The CMYK signal output from the UCR unit 111 is subjected to density adjustment in a γ-correction unit 112 and also subjected to smoothing or edge processing in a filter unit 113.

The CMYK signal processing in the above manner is converted from the 8-bit multilevel signal into a binary signal by a binarization unit 117. As this conversion method, one of the following methods may be used: the dither method, error diffusion method, their improved methods, and the like. The image signal having undergone these processes is sent from the printer interface 353 or external interface 313 to the printer or another device.

Reference numeral 118 denotes an ACS unit which is a characteristic feature of this embodiment. The ACS unit 118 performs ACS processing on the basis of the RGB signal output from the input masking unit 105. The ACS unit 118 will be described in detail later.

[Generation of Image Signal]

Image signal generation processing in the scanner unit 380 will be described below with reference to FIGS. 3A and 3B.

Figure 3A:
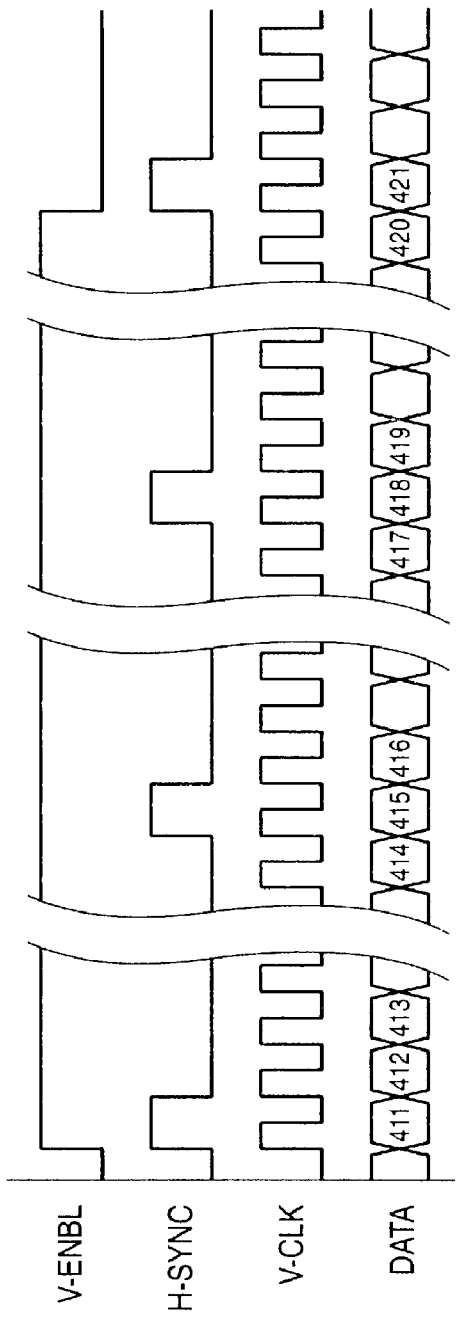
FIGS. 3A and 3B are views showing how an image signal is generated in the scanner unit.

FIG. 3A is a timing chart showing the read timing of an image signal in the scanner unit 380. Referring to FIG. 3A, reference symbol V-ENBL denotes a signal indicating a valid image interval in the sub-scanning direction; H-SYNC, a sync signal in the main scanning direction; V-CLK, a sync signal for one pixel in the main scanning direction; and DATA, an image signal that is read from the CCD 101 and A/D-converted. Although only one signal is presented as DATA in this case, Data-R, Data-G, and Data-B actually exist for the respective color components, i.e., R, G, and B components.

Figure 3B:
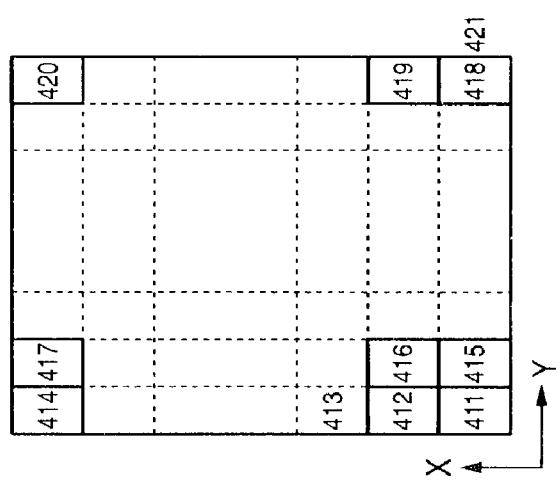

FIG. 3B is a schematic view showing the correspondence between an original image and the image signal obtained by reading the image. Referring to FIG. 3B, the main-scanning direction is the X-direction, and the sub-scanning direction is the Y-direction. That is, the CCD 101 includes pixels (light-receiving sensors) in the X-direction, and captures an image signal while moving from the left to the right (Y-direction) in FIG. 3B.

As described above, when the first carriage 314 is driven at a constant speed and reaches the original read start point shown in FIG. 3B, V-ENBL is set at a valid level to indicate the valid area of an image, thereby indicating the valid area of the image data, i.e., the start position. At this time, the image which the first carriage 314 projects on the CCD 101 corresponds to the first line in the main scanning direction, which is indicated by "411" to "414" in FIG. 3B.

At this time, H-SYNC is synchronized with V-CLK in response to the valid edge of a synch signal in the sub-scanning direction as a trigger to read an image from the CCD 101. The read image is converted into digital data in the digital image processing unit 312 to be converted into image data DATA indicated by 411, 412, 413, . . . , 414.

With respect to a time corresponding to one period of H-SYNC, the first carriage 314 is accurately controlled to move to the next capture line. After the first line is captured, data DATA415 to DATA417 of the second line are captured in the same manner as described above. This operation is sequentially and consecutively repeated to capture data up to data DATA418 to DATA420 of the last line. When capturing in the sub-scanning direction is complete, V-ENBL is turned off to indicate that valid image data is no longer being scanned. For example, reference numeral 421 in FIG. 3B denotes image data outside the valid image.

In this manner, in the scanner unit 380, an original can be read and captured as two-dimensional image data.

<Arrangement of Printer Unit>

The arrangement of the printer unit 381 will be described in detail next with reference to FIG. 1.

[Outline of Apparatus Configuration]

In the printer unit 381, reference numeral 385 denotes a printer CPU for controlling the overall printer unit 381 by using a RAM (not shown) as a work area on the basis of the control programs stored in a ROM (not shown); 384, an image processing unit for performing image processing to generate a signal used for the formation of an image (to be described later); and 383, a scanner interface for connecting a scanner device when the printer unit 381 is to be used as part of the image copying apparatus.

Reference numeral 382 denotes an external interface. Although not shown in FIG. 1, in this embodiment, a device that is required to output an image to this printer, e.g., a LAN interface device for connection to a network or a SCSI interface device for connection to a personal computer or the like can be connected to the external interface 382. Image data in a predetermined form can be output from the external interface 382 at a predetermined timing by making the printer CPU 385 communicate with the CPU of the external device via this interface.

Reference numeral 317 denotes an M image forming unit; 318, a C image forming unit; 319, a Y image forming unit; and 320, a K image forming unit. Since the respective image forming units 317 to 320 have the same arrangement, the arrangement of the M image forming unit 317 will be described in detail below, and description of the remaining image forming units will be omitted.

The M image forming unit 317 includes a photosensitive drum 342. When this drum is irradiated with light from an LED array 210, a latent image is formed on the surface. Reference numeral 321 denotes a primary charger which charges the surface of the photosensitive drum 342 at a predetermined potential to prepare for the formation of a latent image; and 322, a developing unit which forms a toner image by developing the latent image on the photosensitive drum 342. Note that the developing unit 322 includes a sleeve 345 for developing an image by applying a developing bias. Reference numeral 323 denotes a transfer charger for discharging a transfer belt 333 from its back surface to transfer the toner image on the photosensitive drum 342 onto a printing sheet on the transfer belt 333. In the printer unit 381 in this embodiment, since the transfer efficiency is high, no cleaner unit for cleaning residual toner is not mounted. Obviously, however, a cleaner unit may be mounted in the printer unit 381.

[Image Forming Method]

Each component will be described below along with an actual image formation procedure. The printing sheets or the like stored in cassettes 340 and 341 are picked up one by one by feed rollers 336 and 337 and fed onto the transfer belt 333. Reference numeral 348 denotes a transfer belt roller which drives the transfer belt 333 and also charges a fed printing sheet at a predetermined potential, together with a chucking charger 346, thereby chucking the printing sheet on the transfer belt 333; and 347, a sheet leading edge sensor for detecting the leading edge of the printing sheet on the transfer belt 333. A detection signal from the sheet leading edge sensor 347 is also sent to the scanner unit 380 to be used as a sub-scanning sync signal when the scanner unit 380 sends an image signal to the printer unit 381.

Subsequently, the printing sheet is conveyed by the transfer belt 333, and toner images are formed on the surface in the order of M, C, Y, and K by the image forming units 317 to 320. The printing sheet that has passed through the K image forming unit 320 is charge-removed by a charge-remover 349 to be easily separated from the transfer belt 333. The printing sheet is then separated from the transfer belt 333. Reference numeral 350 denotes a separation charger for preventing an image disturbance due to a separation discharge when the printing sheet is separated from the transfer belt 333. The separated printing sheet is charged by pre-fixing chargers 351 and 352 to compensate the adhesion of toner and prevent an image disturbance. Thereafter, the toner image is thermally fixed by a fixing unit 334, and the printing sheet is discharged onto the paper discharge tray 335.

[Details of Printer Image Processing]

Figure 4:
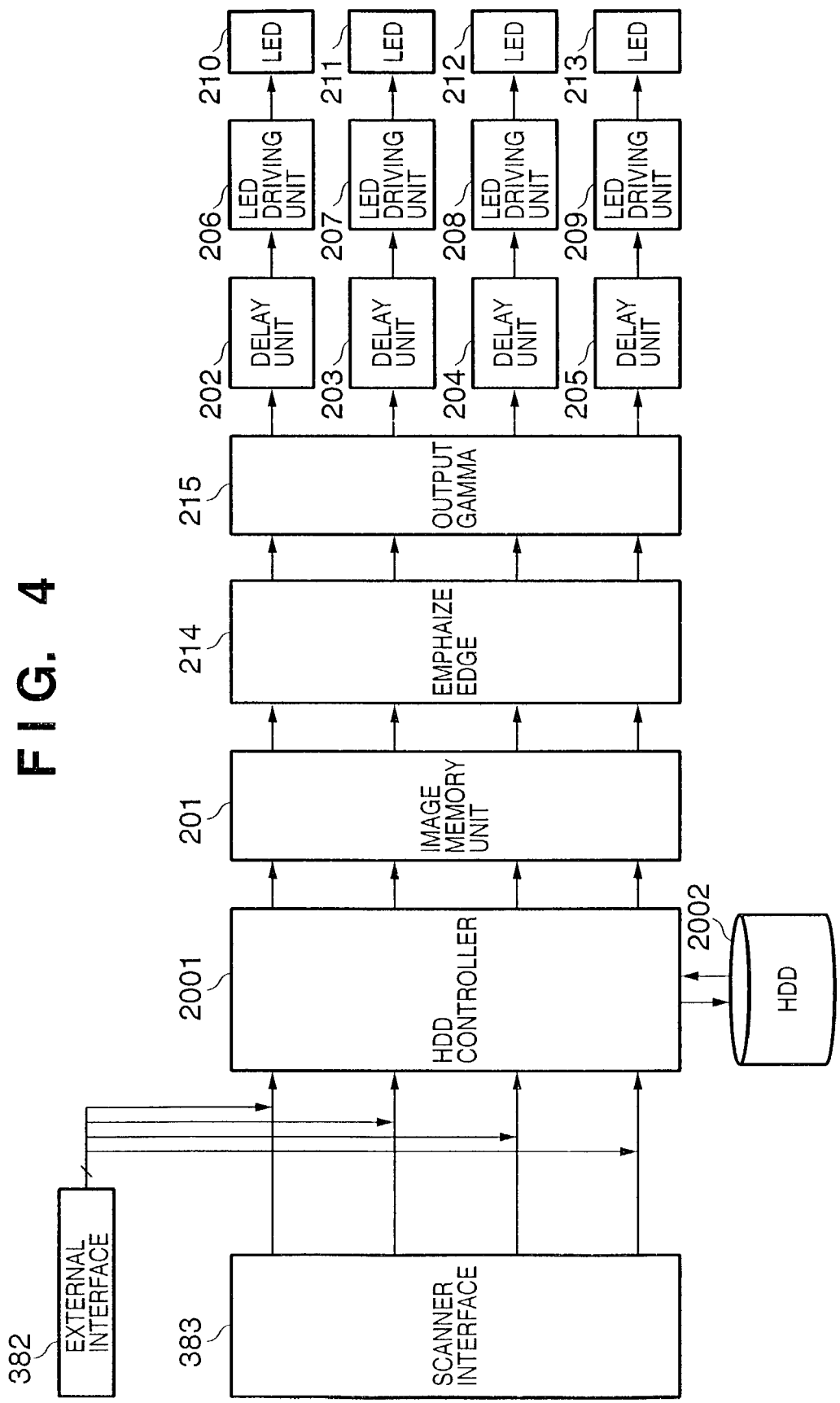
FIG. 4 is a block diagram showing the arrangement of the image processing unit in the printer unit.

Image processing in the image processing unit 384 will be described in detail below. FIG. 4 is a block diagram showing the detailed arrangement of the image processing unit 384. Each component is controlled by the printer CPU 385. Note that the arrangement shown in FIG. 4 is connected to the detailed arrangement of the digital image processing unit 312 in the printer unit 381 described above.

The CMYK image data output from the printer interface 353 of the scanner unit 380 in FIG. 1 is input to the scanner interface 383 of the printer unit 381. This means that a scanner image is input from the scanner interface 383 in FIG. 4. The input CMYK image data is stored in an HDD (Hard Disk Drive) 2002 via an HDD controller 2001.

The HDD controller 2001 and HDD 2002 are characteristic features of this embodiment. The HDD controller 2001 controls writing, reading, and the like of a large amount of image data with respect to the HDD 2002 to provide an image server function. In this case, the image server function is a function of temporarily storing a large amount of image data in the apparatus and processing desired image data as needed, thereby improving the processing efficiency. It therefore suffices if the HDD 2002 is a nonvolatile storage device having a capacity large enough to store many image data. For example, a nonvolatile RAM may be used in place of the HDD 2002. In such a case, however, a RAM controller must be prepared in place of the HDD controller 2001. The operation of the HDD 2002 serving as an image server and HDD controller 2001 will be described later.

The CMYK image data read out from the HDD 2002 via the HDD controller 2001 is temporarily stored in an image memory unit 201. Note that the image memory unit 201 has a capacity large enough to hold at least one page of image data, and may be a semiconductor memory or permanent memory on principle or a combination thereof. That is, a memory having any arrangement can be used as long as it is designed to store images.

At the same time or after the image data is stored in the image memory unit 201, the image data is read out from the image memory unit 201 in response to an image output request such as a sheet leading edge signal from the leading edge sensor 347. The read image data is edge-emphasized by an edge emphasizing unit 214. The resultant data is then subjected to table conversion in an output gamma conversion unit 215 in accordance with the characteristics of the printer. The respective image data, i.e., the C, M, Y, and K image data, are respectively sent to delay units 202 to 205, in which the timings of the image data are shifted by predetermined delays for the respective colors, thereby adjusting the differences between the sheet leading edge sensor and the respective image forming units. This makes it possible to print the four color images at predetermined positions. LED driving units 206 to 209 generate driving signals for LEDs 210 to 213 for the respective colors.

<Image Copying Function>

Operation in a case wherein the image forming apparatus of this embodiment is to implement the image copying function will be described below. When the copy button of the operation unit 355 is pressed, the scanner unit 380 outputs an output request to the printer unit 381. The printer unit 381 then supplies an image read request to the scanner unit 380. The scanner unit 380 starts reading an original image in the above manner. At the same time or after the image is read, the printer unit 381 forms an image on a printing sheet on the basis of the image data input from the scanner unit 380, and discharges the sheet onto a paper discharge tray 335.

In this manner, in the image forming apparatus of this embodiment, an original image can be copied.

<ACS Function>

The ACS (Auto Color Select) function of automatically determining whether an original image to be read is a monochrome or color image will be described below.

[Outline of ACS Operation]

The ACS function is a function of determining whether an original image is a color or monochrome image. It therefore suffices if the saturation of each pixel is obtained, and color determination is performed on the basis of the number of pixels whose saturations are equal to or higher than a given threshold. Even if a monochrome original is read, the read image includes many color pixels around the edges from a microscopic viewpoint due to the influences of processes such as MTF correction. In general, therefore, it is difficult to simply perform ACS determination on a pixel basis. For this reason, various methods have been proposed as ACS methods. Since an ACS method itself is not a characteristic feature of this embodiment, the following description is made assuming that ACS operation is performed by a general method.

Figure 5:
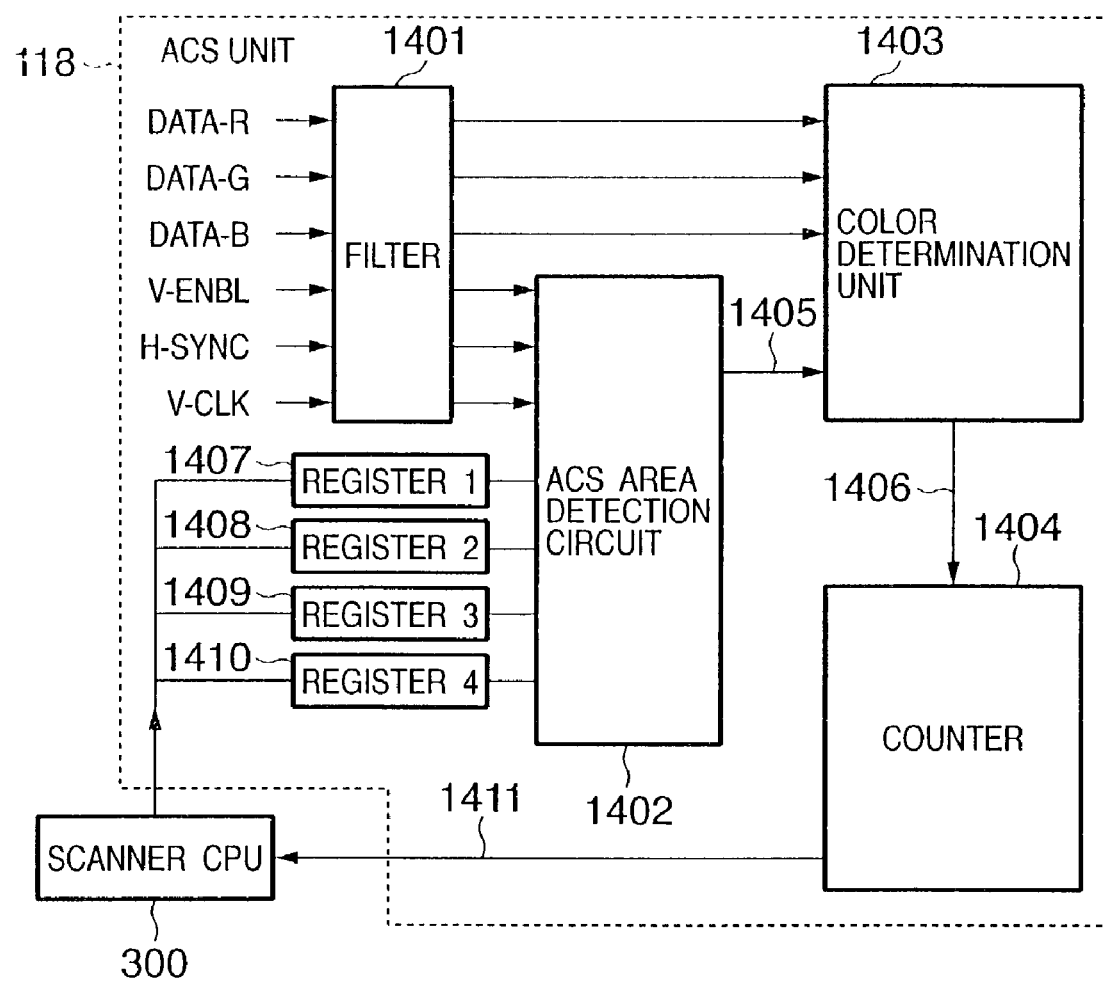
FIG. 5 is a block diagram showing the arrangement of an ACS unit.

FIG. 5 is a block diagram showing the detailed arrangement of the ACS unit 118 in FIG. 2. As is obvious from FIG. 5 as well, the ACS unit 118 is controlled by the scanner CPU 300.

As described above, even when a monochrome image is read, the read image includes many color pixels from a microscopic viewpoint. Therefore, whether a given pixel is really a color pixel must be determined on the basis of the information of color pixels around the target pixel. For this purpose, the ACS unit 118 includes a filter 1401 having a FIFO structure to refer to pixels around a target pixel. Reference numeral 1402 denotes an ACS area detection circuit for generating an ACS area signal 1405 representing an area (ACS area) where ACS operation is to be executed, on the basis of the values set in registers 1407 to 1410. Note that the generation processing of the ACS area signal 1405 will be described in detail later.

Reference numeral 1403 denotes a color determination unit for referring to the neighboring pixels held in the filter 1401 with respect to a target pixel in response to the input ACS area signal 1405 as an enable signal, thereby determining whether the target pixel is a color or monochrome pixel and outputting a color determination signal 1406. More specifically, in the ACS area indicated by the ACS area signal 1405, the minimum value of DATA-R, DATA-G, and DATA-B is subtracted from the values of the remaining two components, and the absolute value of the difference between the obtained two values is obtained as a saturation. Only when specific continuity of pixels having saturations higher than a given threshold can be recognized, the target pixel is determined as a color pixel, and the color determination signal 1406 is output.

Reference numeral 1404 denotes a counter for counting the color determination signals 1406 output from the color determination unit 1403. The count result is then sent as an ACS determination signal 1411 to the scanner CPU 300. After the original is completely scanned, the scanner CPU 300 can determine, on the basis of the ACS determination signal 1411 output from the counter 1404, whether the original is a color or monochrome image.

As described above, the scanner CPU 300 determines an area, in a read range, in which ACS operation is to be executed, and sets values indicating the area in the registers 1407 to 1410. In this embodiment, an ACS area can be set independently of the size, position, and the like of the original placed on the document glass 301.

[Setting of ACS Area]

Generation processing of the ACS area signal 1405 based on the values set in the registers 1407 to 1410 in the ACS area detection circuit 1402 will be described in detail below with reference to FIGS. 6A and 6B.

Figure 6A:
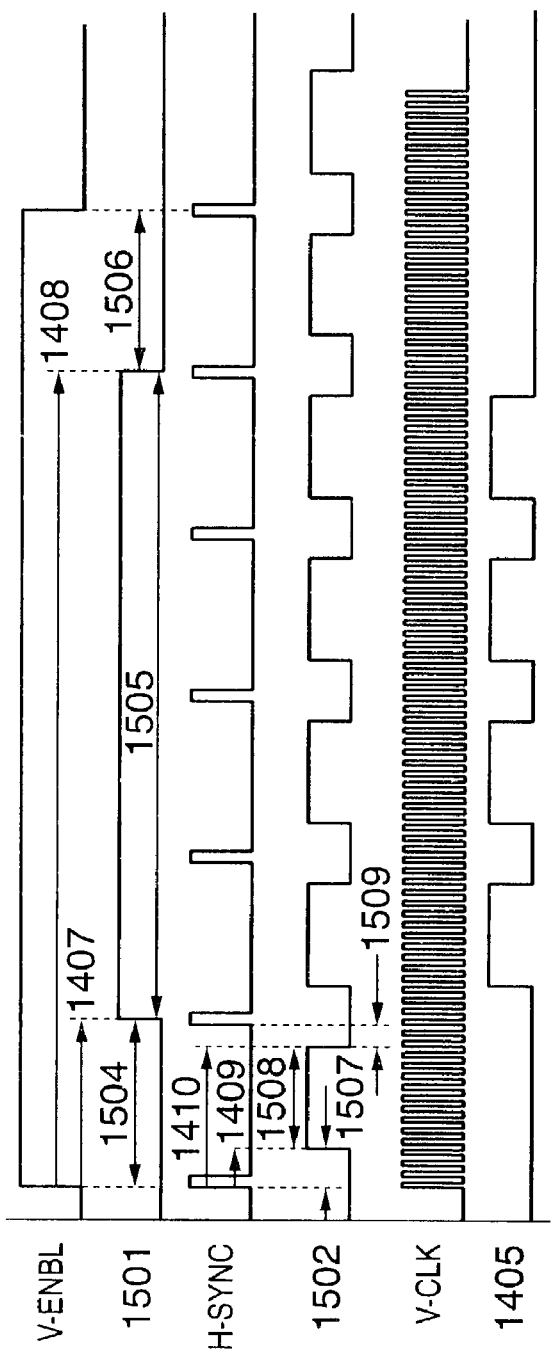
FIGS. 6A and 6B are views showing the relationship between an image signal and an ACS area in the scanner unit.

FIG. 6A is a timing chart showing how an ACS area signal is generated on the basis of the respective signals shown in FIG. 3A and the values set in the registers 1407 to 1410. Referring to FIG. 6A, reference numeral 1501 denotes a sub-scanning ACS area signal 1501 indicating an ACS area in the sub-scanning direction. At the timing of a valid edge of V-ENBL, H-SYNC begins to be counted. When a compare match with the value set in the register 1407 occurs, the sub-scanning ACS area signal 1501 is set at valid level H. When a compare match with the value set in the register 1408 occurs, the sub-scanning ACS area signal 1501 returns to invalid level L. In the case shown in FIG. 6A, the sub-scanning ACS area signal 1501 is set at H level at second H-SYNC from a valid edge of V-ENBL, and returns to L level at sixth H-SYNC. It is obvious from this that the values "2" and "6" are respectively set in the registers 1407 and 1408.

Reference numeral 1502 denotes a main scanning ACS area signal indicating an ACS area in the main scanning direction. At the timing of a valid edge of H-SYNC, V-CLK begins to be counted. When a compare match with the value set in the register 1409 occurs, the main scanning ACS area signal 1502 is set at valid level H. When a compare match with the value set in the register 1410 occurs, the main scanning ACS area signal 1502 returns to invalid level L. In the case shown in FIG. 6A, the main scanning ACS area signal 1502 is set at H level at fourth V-CLK from a valid edge of H-SYNC, and returns to L level at 13th V-CLK. It is obvious from this that the values "4" and "13" are respectively set in the registers 1409 and 1410.

The ACS area detection circuit 1402 generates the ACS area signal 1405 by ANDing the sub-scanning ACS area signal 1501 and main scanning ACS area signal 1502.

Figure 6B:
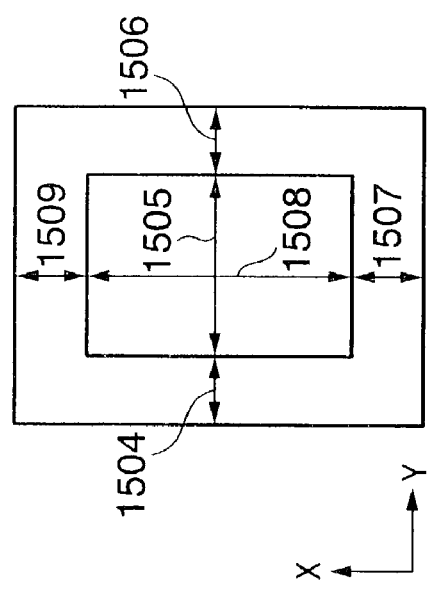

FIG. 6B is a view showing the relationship between the timing chart in FIG. 6A and the read position of the original image. The main scanning direction is the X direction, and the sub-scanning direction is the Y direction. Referring to FIG. 6B, the outer rectangle indicates a normal image read area, and the inner rectangle indicates an ACS area. Referring to FIG. 6B, the sizes denoted by reference numerals 1504 to 1509 change in accordance with the contents of the registers 1407 to 1410. That is, the sizes 1504 to 1509 correspond to the range indicated by the same numbers in FIG. 6A.

[General ACS Sequence]

In performing ACS operation, in general, a real scan for actually reading an image signal and a prescan for the execution of ACS operation are separately controlled.

General ACS processing will be described below with reference to the flow chart of FIG. 7. As described above, this ACS processing is controlled by the scanner CPU 300.

Figure 7:
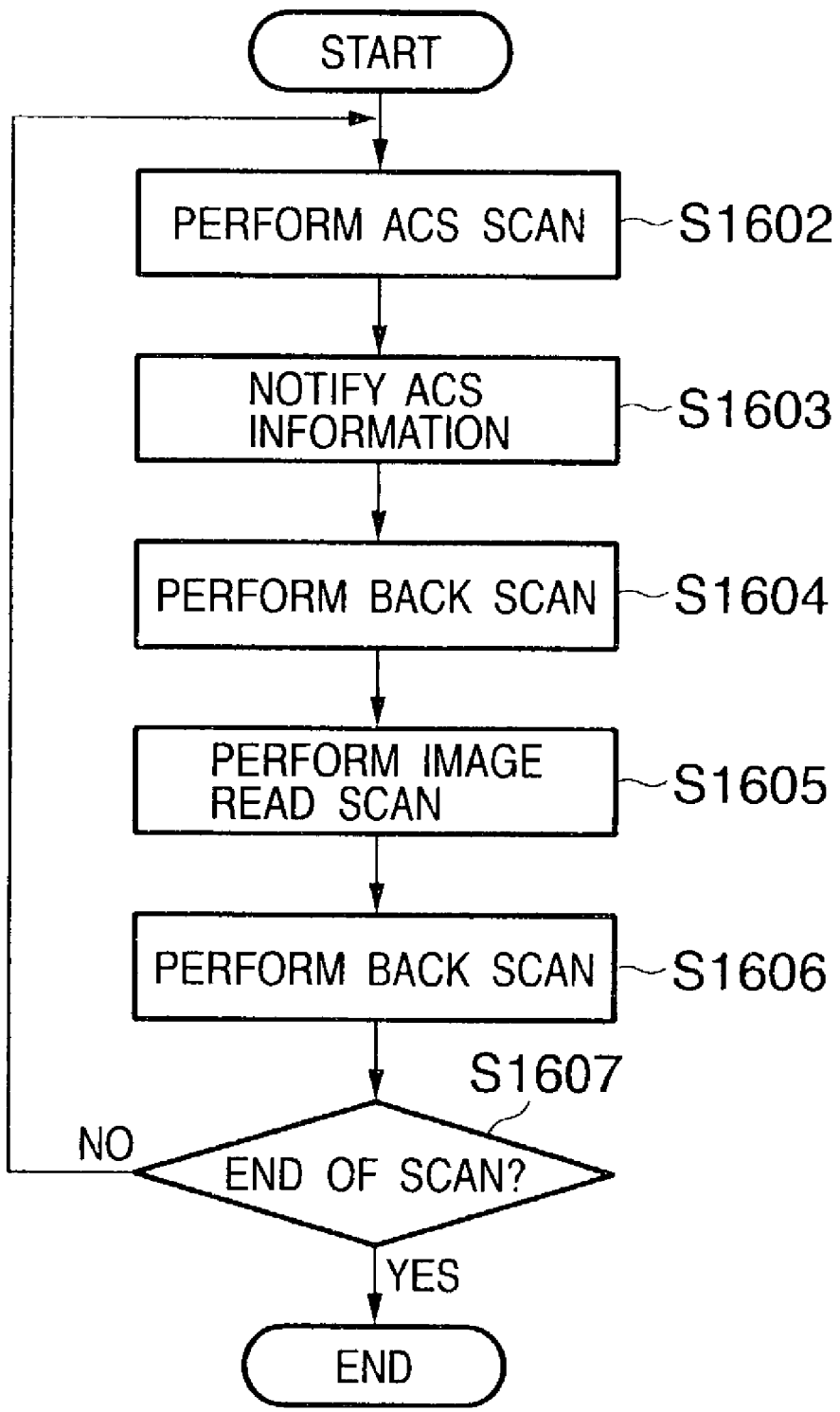
FIG. 7 is a flow chart showing general ACS processing.

Referring to FIG. 7, when a job started by, for example, pressing the copy button of the operation unit 355, and an ACS sequence is started, a prescan (ACS scan) for ACS operation is performed in step S1602. When a color mode for the original is confirmed upon execution of ACS operation in step S1603, the printer unit 381 is notified of information for switching image formation processes, and image processing parameters in the scanner unit 380 are determined under the control of the scanner CPU 300.

In step S1604, in order to prepare for a real scan for the original, the first mirror base 314 is moved to return from the preceding ACS end point to the read start position for the original (back scan).

In step S1605, a real scan is executed to read an image signal. In step S1606, to prepare for processing for the next original, the first mirror base 314 is moved to return to the read start position for the original (back scan). If there is no next original and scanning is complete in step S1607, the job is terminated. If there is a next original, the flow returns to step S1602 to repeat the above processing after the original is replaced with the new one.

In this manner, in general ACS processing, two scans, i.e., an ACS scan and real scan, are performed for one original.

[ACS Sequence in First Embodiment]

A general ACS sequence has been described above. An ACS sequence unique to this embodiment will be described below.

As described above, in conventional ACS processing, two scans are performed for one original, and hence a deterioration in productivity inevitably occurs. This embodiment is, however, characterized in that ACS processing and reading of image data are simultaneously performed in one scan.

ACS processing in this embodiment will be described with reference to the flow chart of FIG. 8. Note that ACS processing in this embodiment is also controlled by the scanner CPU 300.

Figure 8:
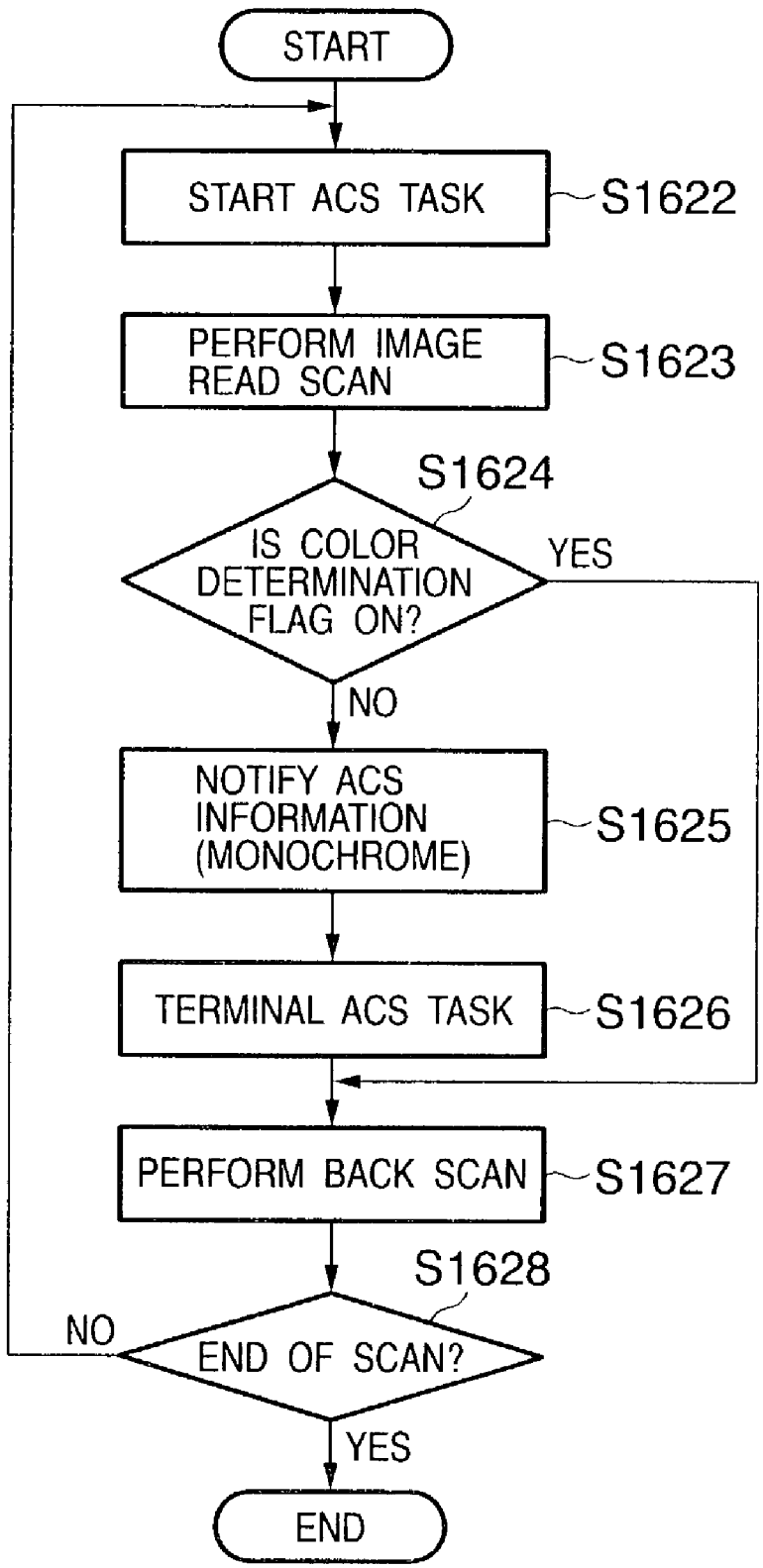
FIG. 8 is a flow chart showing ACS processing in this embodiment.

Referring to FIG. 8, when a job is started by pressing the copy button of the operation unit 355 and an ACS sequence is started, an ACS task is activated in step S1622. The ACS task in this embodiment is a task for executing ACS operation during a real scan for reading image data by monitoring the contents of the register in the counter 1404, i.e., the count value represented by the color determination signal 1406.

In step S1623, a scan for reading an image, which corresponds to a real scan in the prior art, is started. The image data read by this scan is sent to the printer unit 381 and written in the HDD 2002 to be stored/held in the printer.

Figure 9:
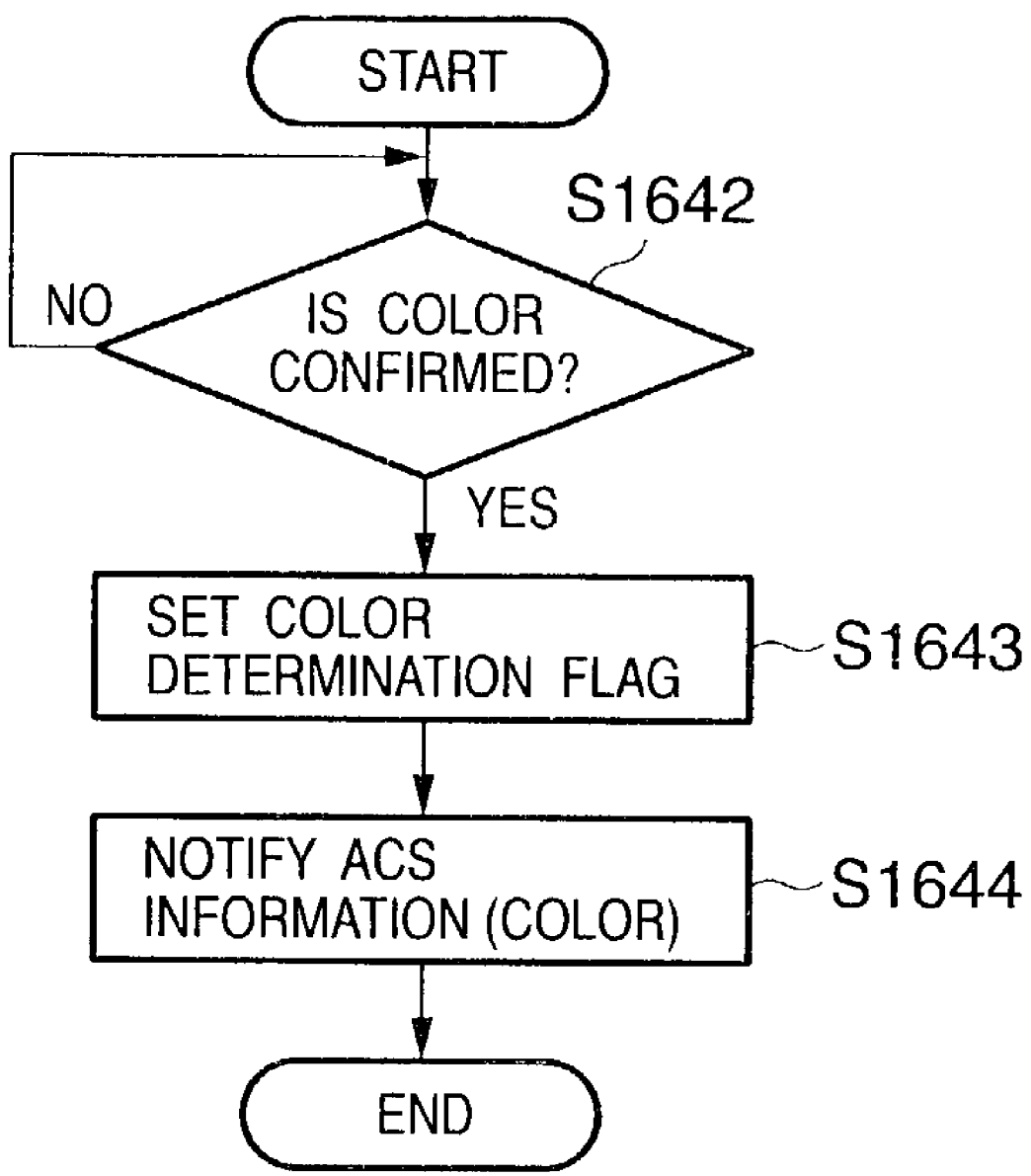
FIG. 9 is a flow chart showing an ACS task in this embodiment.

In this embodiment, the ACS task operates during the scan in step S1623. FIG. 9 is a flow chart for the ACS task. In this task, in step S1642, it is monitored whether the count value of the counter 1404 becomes equal to or larger than a predetermined threshold. If the count value exceeds the threshold, since it is determined that the original is a color original, the flow advances to step S1643 to set a color determination flag. In step S1644, the printer unit 381 is notified that the ACS determination result indicates "color", and then this task is terminated under the control of scanner CPU 300.

Referring back to FIG. 8, when the scan in step S1623 is complete, the color determination flag set by the ACS task is evaluated in step S1624. If the color determination flag is ON, it has already been determined in the ACS task that the original is color, and the printer unit 381 has already been notified of the result. The flow therefore returns to step S1627.

If it is determined in step S1624 that the color determination flag is OFF, it is determined that the original is monochrome, the flow advances to step S1625 to notify the printer unit 381, under the control of the scanner CPU 300, that the ACS determination result is "monochrome". In step S1626, the ACS task is terminated.

In this case, if the color determination flag is OFF, it is unconditionally determined that the original is monochrome. However, a color mode may be determined by referring to the count value of the counter 1404 again in step S1625.

In step S1627, a back scan is performed to move the first carriage 314 to the read position for the next image so as to prepare for reading of the next original. In step S1628, it is checked whether there is any original to be scanned next and scanning is complete. If NO in step S1625, the flow returns to step S1622 to repeat the above processing. If YES in step S1628, the job is terminated.

As described above, ACS processing in this embodiment is characterized in that ACS determination is performed simultaneously with reading of an image without performing a prescan, and the printer side is notified of the color information of the original when a color mode is determined while the read image data is transferred or after image transfer is completed. That is, ACS operation for an original image can be executed at high speed by one image reading operation.

In addition, since there is no need to establish read/write synchronization between the scanner and the printer in ACS operation, for example, original images can be continuously read at high speed by an ADF (Automatic Document Feeder), thus improving the productivity in ACS operation.

ACS processing in this embodiment can be effectively applied to an image reader of the one-pass input scheme (the scheme of reading an image by a unidirectional scan), in particular, because of no deterioration in productivity.

<Image Server Function>

Another feature of this embodiment is that an image server function is implemented by the HDD controller 2001 and HDD 2002 in FIG. 4. A control method for the HDD 2002 will be described in detail below.

[Image Data Transition]

As described above, the HDD 2002 stores a large amount of CMYK image data, and the HDD controller 2001 performs read control on the HDD 2002.

FIG. 10A is a view showing image data transition on a page basis in a case wherein the printer unit 381 performs so-called two-copy output operation of copying the originals read by the scanner unit 380 two pages at a time. Referring to FIG. 10A, reference numeral 2101 denotes an input phase for image data via the scanner interface 383; 2120 and 2121, write and read phases for the HDD 2002; 2102, write and read (access) phases for the image memory unit 201; and 2103, an image formation phase in the printer unit 381 based on the image data read out from the image memory unit 201. Referring to FIG. 10A, the abscissa represents time, and each rectangle on each phase represents the time required for image processing. The numeral in each rectangle represents an original image page in process. Strictly speaking, the image formation phase 2103 corresponds to the image formation processing done by the edge emphasizing unit 214 and subsequent components in FIG. 4.

Referring to FIG. 10A, the image data of the first page (to be referred to as image 1 hereinafter) read by the scanner unit 380 is written first in the HDD 2002 in the HDD write phase 2120. Note that this write is done at the timing based on an image read sync signal in the scanner unit 380. At almost the same time with this write, image 1 is read out from the HDD 2002 and written in the image memory unit 201 in the HDD readout phase 2121. At almost the same time with this write, image 1 is read out from the image memory unit 201 and used for image formation in the memory access phase 2102. When the first page of image 1 is completely output in the image formation phase 2103, image 1 held in the image memory unit 201 is read out again to output the second page.

The HDD 2002 can store the image data of a plurality of pages. Even if, therefore, the capacity of the image memory unit 201 corresponds to the image data of one page, the image data of the second page (to be referred to as image 2 hereinafter) can be read in the input phase 2101 and stored in the HDD 2002 in the HDD write phase 2120 while the image memory unit 201 is occupied by image 1 in the memory access phase 2102. Image 2 stored in the HDD 2002 is read out and written in the image memory unit 201 when image 1 stops occupying the image memory unit 201 in the memory access phase 2102.

As described above, according to this embodiment, with the formation of an image server using the HDD 2002, even while the image memory unit 201 is occupied for the formation of an image in the printer unit 381, image data can be read by the scanner unit 380. This advantage, provided by this embodiment, can be easily understood by considering a case wherein the HDD 2002 is omitted from the arrangement of the printer unit 381 and image data is directly held in the image memory unit 201. FIG. 10B shows an example in which the image data transition shown in FIG. 10A is made to correspond to the case wherein the HDD 2002 is omitted.

Referring to FIG. 10B, the image data of the first page is read out to be used for image formation at almost the same time when the data begins to be written in the image memory unit 201. Assume that the capacity of the image memory unit 201 corresponds to the image data of one page. In this case, when the second image of the first page is formed, the image data held in the image memory unit 201 can be directly used. Therefore, read processing need only be performed by the scanner unit 380 once per page. However, the image data of the next page cannot be input until the image memory unit 201 become available. This produces a standby time in the scanner unit 380. Obviously, in the input phase 2101, a considerably long nonprocessing time (a standby time in the scanner unit 380) is produced between the first page and the second page.

As is obvious from FIG. 10A, therefore, in this embodiment, since the image server is formed by using the HDD 2002, even if the image memory unit 201 is occupied by data used for image formation in the printer unit 381, the scanner unit 380 can read image data. That is, read processing in the scanner unit 380 can be separated from output processing in the printer unit 381.

In addition, since a plurality of image data can be held in the HDD 2002, the held image data can be output as needed even at a time other than the time immediately after an image is read by the scanner unit 380.

Furthermore, pages can be laid out by controlling the read order of the image data of a plurality of pages stored in the HDD 2002.

[Header Format]

In this embodiment, when image data is to be stored in the HDD 2002, a header is attached to the data by the HDD controller 2001. FIG. 11 shows an example of the format of the header. Each item of this header will be described below. Obviously, the layout of the respective items of the header can be arbitrarily changed.

When the image data read by the scanner unit 380 is input to the HDD controller 2001, an image ID 2201 is attached to the image data as unique information for identifying the image data. In step S1625 in FIG. 8 or step S1644 in FIG. 9, the ACS result sent from the printer unit 381 is stored as a color mode 2202.

The remaining items are set as follows. A read resolution in the scanner unit 380 is set as a resolution 2203. The size of the read image data is set as an image size 2204. The information about the date when the image data is input is set as a date 2205. Obviously, the respective times of the header are not limited to those shown in FIG. 11, and other pieces of information about the image data can also be held.

Figure 12A:
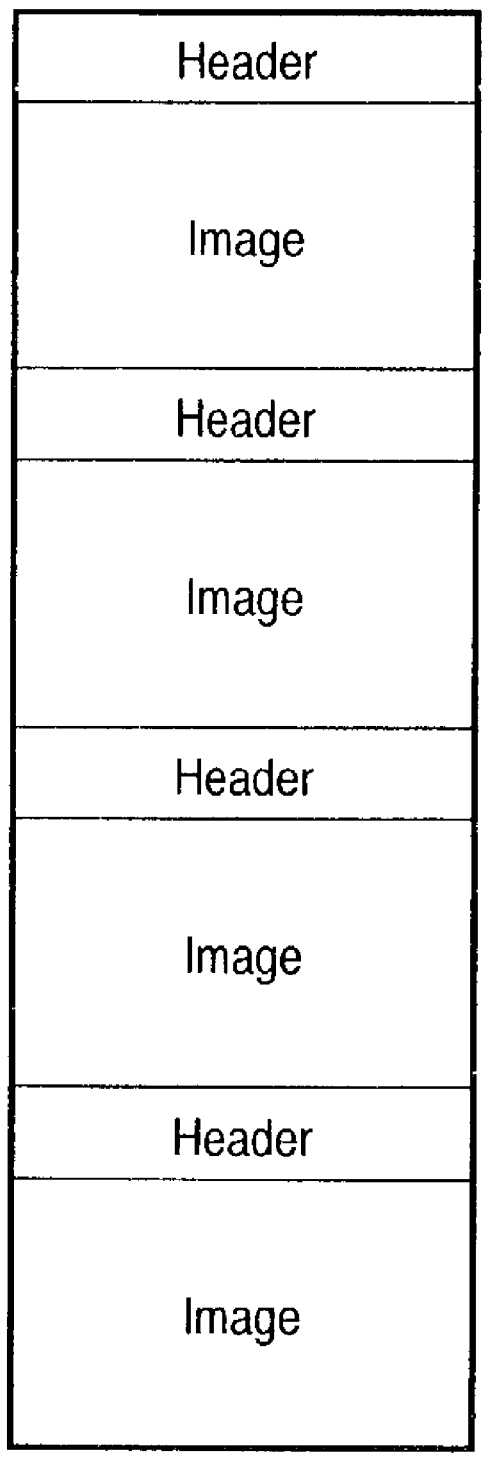
FIG. 12A is a view showing an example of how headers for a plurality of image data are stored.

This header is generated every time image data is stored in the HDD 2002 (i.e., for each image) in the HDD write phase 2120 shown in FIG. 10A. The generated headers are stored in the HDD 2002, together with image data, in the form shown in FIG. 12A or 12B. Referring to FIGS. 12A and 12B, "Image" represents each image data, and "Header" represents a header corresponding to each image data. Each header has the format shown in FIG. 11. FIG. 12A shows a case wherein headers are stored upon being attached to the heads of the respective image data. FIG. 12B shows a case wherein only the headers of the respective image data are stored together in another area.

[Print Processing]

In this embodiment, desired image data can be selectively output from a plurality of image data stored in the HDD 2002 by using the image server function using the HDD 2002.

Figure 13:
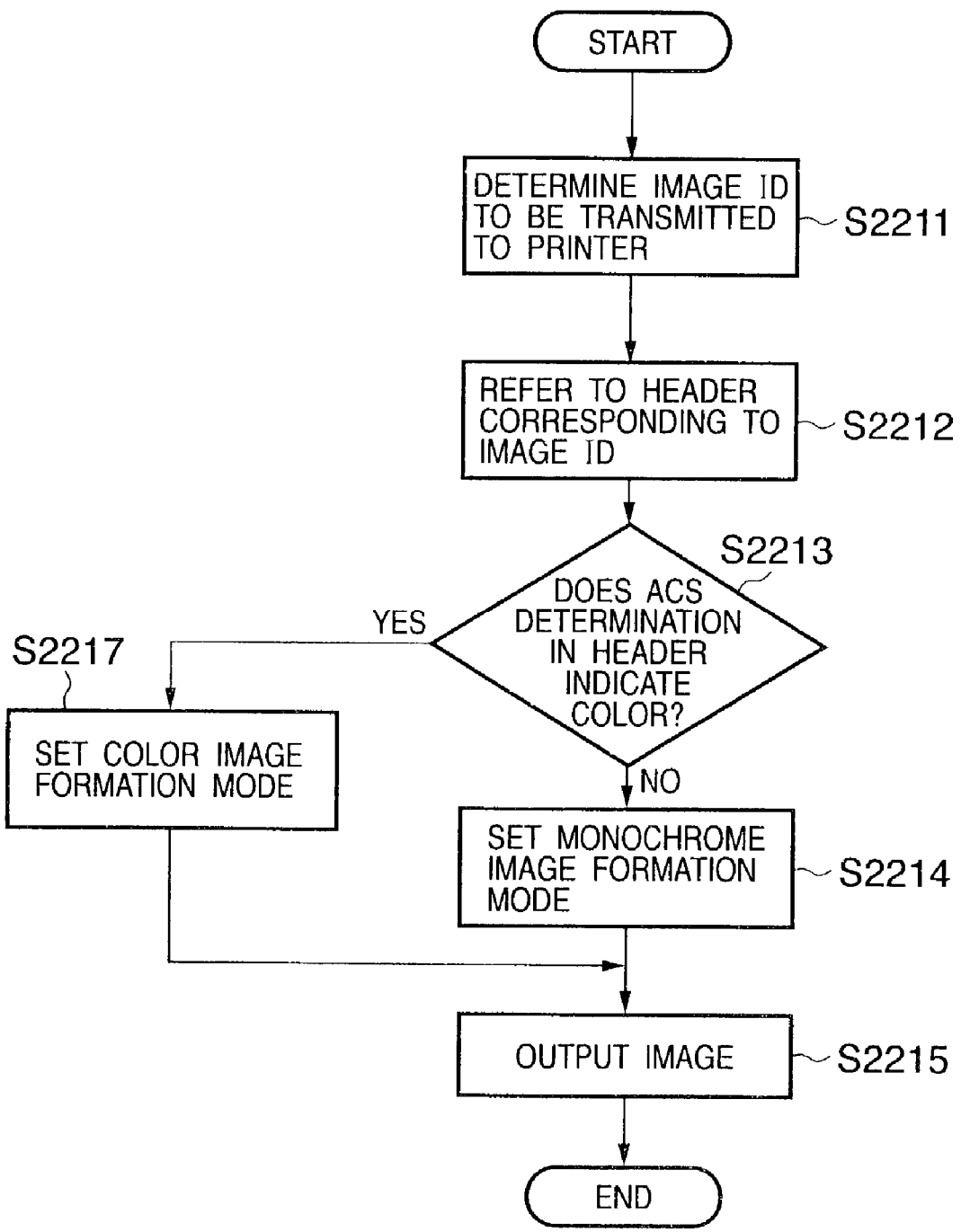
FIG. 13 is a flow chart showing print processing using an image server function in this embodiment.

Print processing using the image server function in this embodiment will be described below with reference to the flow chart of FIG. 13.

When the ID of image data to be printed is determined on the basis of, e.g., a user instruction in step S2211, a header corresponding to the image ID is detected from the HDD 2002 and referred to in step S2212. In step S2213, it is checked on the basis of the color mode 2202 in the header whether the image data to be printed is color or monochrome. If the image data is monochrome, the flow advances to step S2214 to set a monochrome image formation mode in the printer unit 381. If the image data is color, the flow advances to step S2217 to set a color image formation mode in the printer unit 381.

Note that setting of an image formation mode is not specifically limited as long as it is done by the printer CPU 385 to realize image formation suitable for the color mode. For example, by controlling switching of edge emphasis amounts in the edge emphasizing unit 214 and table values in the output gamma conversion unit 215 in FIG. 4, image processing suitable for the color mode can be done, and a good image can be formed. In addition, an image formation process optimal for the color mode of an original can be selected by controlling switching between the use of all the image forming units for M, C, Y, and K on the basis of the color mode.

When the setting of an image formation mode is complete, the image data to be printed is read out from the HDD 2002 in step S2215, and a good image complying with the color mode is formed on a printing medium and output in accordance with the above image formation process.

As described above, according to this embodiment, in the arrangement in which the image server function is implemented by an HDD capable of holding a large amount of image data, ACS operation for an original image can be executed at high speed by one image read operation. Therefore, image formation suitable for the color mode can be executed in image forming operation by holding the image data in the HDD, together with the ACS result.

This embodiment has exemplified the case wherein the printer unit 381 has an image server function. However, a different component may have this function as long as it can process a large amount of image data. The embodiment has also exemplified the case wherein the image server function is implemented by the HDD 2002. However, the present invention is not limited to this as long as a page memory having a sufficiently large capacity can be ensured.

Note that this embodiment has exemplified the case wherein image formation is performed on the basis of the color mode obtained as an ACS result. However, the present invention is not limited to this. For example, the image data read by the scanner unit 380 and color mode information can be output together to another apparatus via the external interface 313.

<Second Embodiment>

The second embodiment of the present invention will be described below.

A characteristic feature of the second embodiment is that an image box function is added to the arrangement of the first embodiment described above. In this case, the image box function is a function of temporarily storing a plurality of image data and their titles upon forming them into groups (boxes) in the apparatus and outputting the stored data on a box basis as needed. The image box function of the second embodiment can be implemented by the same arrangement as that (FIG. 4) implementing the image server function of the first embodiment. Since a method of storing image data in an HDD 2002 and an image forming method are the same as those in the first embodiment, a description thereof will be omitted. Assume that a large amount of image data are stored in the HDD 2002, and an image suitable for the color mode can be formed by reading out desired image data.

Figure 14:
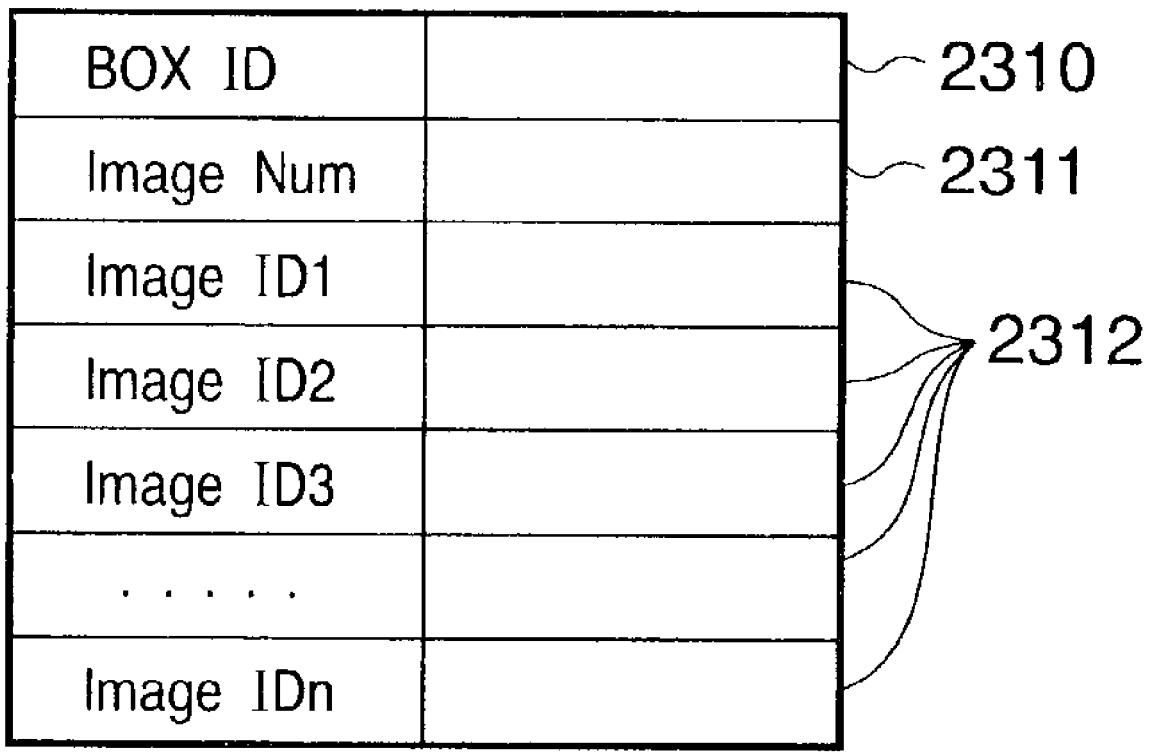
FIG. 14 is a view showing an example of a management table for an image box.

In the second embodiment, the image data in the HDD 2002 are formed into groups in accordance with application purposes, and image foxes are formed for the respective groups. More specifically, in the HDD 2002, the management table shown in FIG. 14 is prepared for each group, i.e., each image box. When image data is to be stored, the management table for the image box to which the image data belongs is updated, or a management table is generated for a new image box. Note that whether image data belongs to any specific image box is determined on the basis of data attributes or a user instruction. Note that management tables may be generated in a storage area other than the HDD 2002.

Referring to FIG. 14, reference numeral 2310 denotes a box ID to be defined to identify an image box; and 2311, an image data (file) count managed by the image box. The IDs of image data (image IDs) managed by the image box are set in fields 2312.

In the second embodiment, each image data stored in the HDD 2002 has a header as in the first embodiment, and the header format is the same as that (FIG. 11) in the first embodiment except that a box ID 2206 is added as an item as shown in FIG. 15. Note that the image ID 2312 (FIG. 14) in the management table corresponds to an image ID 2201 in the image header (FIG. 15).

In the second embodiment, such a management table is used to link the image data included in each image box and implement the image fox function. A characteristic feature of this embodiment is that flexibility is given to color mode setting for image data.

A color mode setting method in the second embodiment will be described in detail below.

Figure 16:
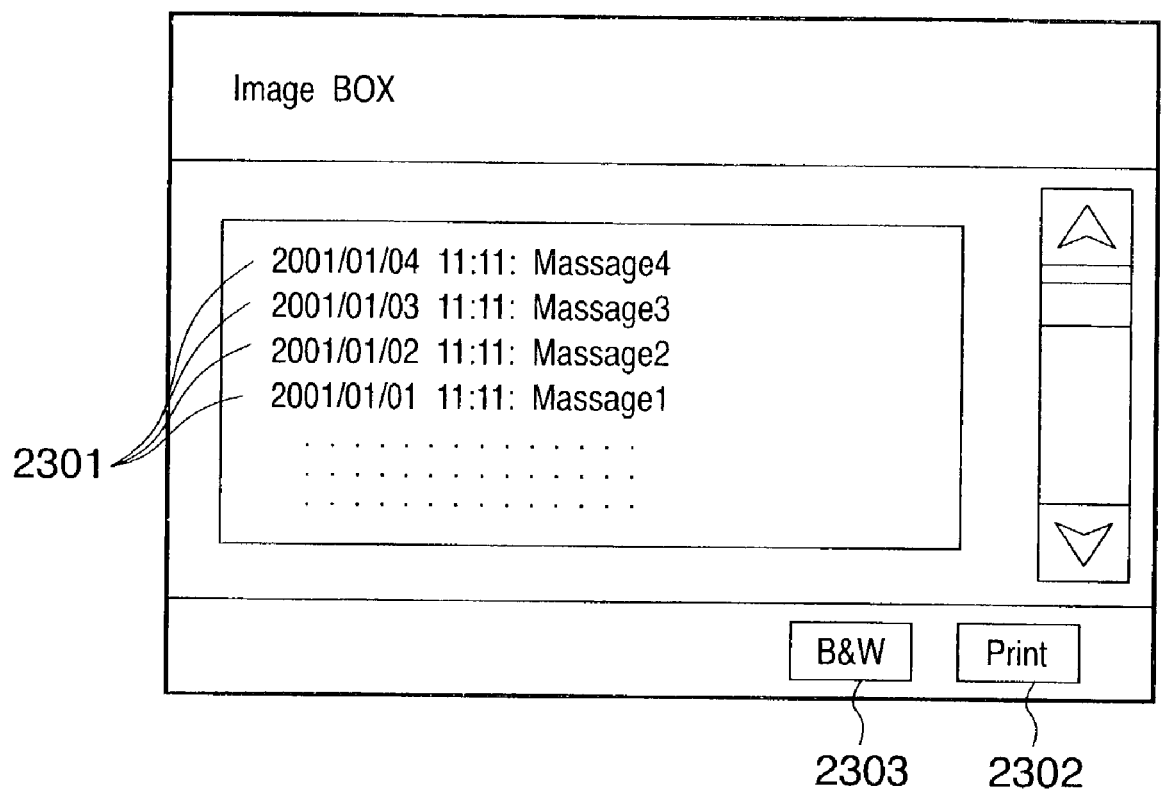
FIG. 16 is a view showing an example of a list of image boxes in the second embodiment.

FIG. 16 shows a user interface for image formation, i.e., an LCD window display sample on an operation unit 355 of an image forming apparatus, in the second embodiment. As shown in FIG. 16, a list of image box information about a plurality of management tables existing in the HDD 2002 is displayed. When the user selects one or a plurality of image boxes from image box information 2301 on the display window and presses a print button 2302, all image data included in the selected image box can be read out from the HDD 2002 by referring to the management table for the image box and printed out.

Note that reference numeral 2303 denotes a monochrome output button, which is a toggle button for forced monochrome output operation. If the monochrome output button is ON when the print button 2302 is pressed, a monochrome image is formed even if the image data in the selected image box has a "color" attribute as a color mode (ACS result).

Image formation processing in the second embodiment will be described below with reference to the flow chart of FIG. 17.

First of all, in step S2321, the list of image boxes shown in FIG. 16 is displayed. In step S2322, the user selects a desired image box. In step S2323, a management table for the selected image box is read out from the HDD 2002.

In step S2324, it is checked whether the monochrome output button 2303 is pressed (ON). If an ON state is determined, the flow advances to step S2328 unconditionally to set the monochrome image formation mode. In step S2327, image formation is started. Thereafter, in step S2329, it is checked on the basis of the image data count 2311 in the management table whether all the image data in the image box are completely output. If NO in step S2329, the flow returns to step S2324.

If it is determined in step S2324 that the monochrome output button 2303 is OFF, the flow advances to step S2325 to acquire the header of image data corresponding to the image ID 2312 in the management table. A suitable image formation mode is then set on the basis of the color mode 2202 in the header as in the first embodiment, and image formation is executed.

As described above, since the second embodiment additionally has an image box function with respect to the first embodiment, associated image data can be collectively managed and output.

In addition, even image data that is determined as data having a color attribute by ACS operation can be forcibly output as a monochrome image. This makes it possible to achieve an increase in processing speed and a reduction in cost.

OTHER EMBODIMENT

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is realized even by supplying a storage medium storing software program codes for realizing the functions of the above-described embodiments to a system or apparatus, and causing the computer (or a CPU or an MPU) of the system or apparatus to read out and execute the program codes stored in the storage medium. In this case, the program codes read out from the storage medium realize the functions of the above-described embodiments by themselves, and the storage medium storing the program codes constitutes the present invention. The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

As has been described above, according to the present invention, the overall productivity of the apparatus can be improved by executing ACS operation for original images at high speed. In addition, proper image formation can be done by holding the ACS determination results together with image data.

The present invention is not limited to the above embodiments and various changes and modifications can be made within the spirit and scope of the present invention. Therefore, to apprise the public of the scope of the present invention, the following claims are made.

What is claimed is:

1. An image processing apparatus comprising:
    input means for inputting image data of an original by one optical scan;
    determination means for determining on the basis of the image data whether the original is a color original;
    first nonvolatile holding means for holding pairs of the image data and the determination results obtained by said determination means;
    second nonvolatile holding means for holding pairs of a plurality of image data and the determination results obtained by said determination means, wherein the image data held in said first and second holding means is input by said input means, by one optical scan without a pre-scanning; and
    output means for outputting image data held in said first and second holding means on the basis of the corresponding determination result.

2. The apparatus according to claim 1, wherein a write and read of image data with respect to said first and second holding means are asynchronously performed.

3. The apparatus according to claim 1, wherein said first and second holding means comprise at least one hard disk.

4. The apparatus according to claim 1, wherein said first and second holding means hold the determination result obtained by said determination means as a header for the image data.

5. The apparatus according to claim 1, further comprising selection means for selecting desired image data from a plurality of image data held in said first and/or said second holding means, and
    wherein said output means outputs the selected image data.

6. The apparatus according to claim 5, wherein said first and second holding means form the image data and the determination results into groups and hold the groups, and said selection means selects the group.

7. The apparatus according to claim 6, wherein
    said selection means further is for selecting whether to perform forced monochrome output operation, and
    said output means outputs image data to be output as a monochrome image regardless of the determination result when execution of forced monochrome output operation is selected by said selection means.

8. The apparatus according to claim 1, wherein the image data is image data of one page.

9. The apparatus according to claim 1, wherein said determination means determines, concurrently with inputting of image data by said input means, whether the original is a color original.

10. The apparatus according to claim 1, wherein said output means forms a visible image based on the image data held in said first and/or second image holding means on a printing medium.

11. The apparatus according to claim 10, wherein said output means sets an image processing content associated with the image formation on the basis of the determination result held in said first and/or second holding means.

12. The apparatus according to claim 10, wherein said output means sets a process for the image formation on the basis of the determination result held in said first and/or second holding means.

13. A program, stored in a computer-readable storage medium, being executed by a computer to cause the computer to operate as an image processing apparatus according to claim 1.

14. A computer-readable recording medium on which the program defined in claim 13 is recorded in computer-readable form.

15. An image forming method in an image forming apparatus having first and second nonvolatile storage units capable of storing a plurality of image data, comprising:
    the input step of inputting image data of an original by one optical scan;
    the determination step of determining, on the basis of the image data, concurrently with inputting of the image data, whether the original is a color original;
    the storage step of storing the image data and the determination results as pairs in the first storage unit;
    the storage step of storing the image data and the determination results as a plurality of pairs, in the second storage unit, wherein the image data held in the first and second storage units is input in said input step, by one optical scan without a pre-scanning; and
    the output step of outputting the image data stored in the storage units on the basis of the corresponding determination result.

* * * * *